(12) United States Patent
Adams et al.

(10) Patent No.: US 6,363,485 B1
(45) Date of Patent: Mar. 26, 2002

(54) MULTI-FACTOR BIOMETRIC AUTHENTICATING DEVICE AND METHOD

(75) Inventors: Carlisle Adams, Ottawa; Michael J. Wiener, Nepean, both of (CA)

(73) Assignee: Entrust Technologies Limited, Ottawa (CA)

( * ) Notice: Subject to any disclaimer, the term of this patent is extended or adjusted under 35 U.S.C. 154(b) by 0 days.

(21) Appl. No.: 09/150,430

(22) Filed: Sep. 9, 1998

(51) Int. Cl.[7] .................................................. H04L 9/00
(52) U.S. Cl. ....................................................... 713/186
(58) Field of Search ................................ 713/184, 183, 713/186; 380/258, 267

(56) References Cited

U.S. PATENT DOCUMENTS 5,541,994 A    7/1996    Tomko et al. ................. 380/54
5,680,460 A    10/1997    Tomko et al. ................. 380/23
6,038,315 A    *    3/2000    Strait et al. ................. 713/183

* cited by examiner

*Primary Examiner*—Thomas R. Peeso
*Assistant Examiner*—Matthew Smithers
(74) *Attorney, Agent, or Firm*—Vedder, Price, Kaufman & Kammholz

(57) ABSTRACT

A multi-factor biometric authenticating device and method generates error correction based partial encryption key seed data based on a plurality of sample biometric inputs, such as raw biometric data The error correction based partial encryption key seed data serves as a partial seed for generating a secret encryption key for encrypting user data. The first partial seed is combined with a second partial encryption seed to generate the secret encryption key. The device stores the error correction based partial encryption key seed data and does not store the secret encryption key.

19 Claims, 5 Drawing Sheets

MULTI-FACTOR BIOMETRIC AUTHENTICATING DEVICE AND METHOD

BACKGROUND OF THE INVENTION

The invention relates generally to secure access systems and methods, and more particularly to biometric based access systems.

Biometric devices, such as fingerprint scanners, retinal scanners, voice recognition systems and other similar systems are used as mechanisms for providing secure access to a given system, device, software application or other secure entity. Conventional biometric devices, such as a thumbprint scanner, typically require a user to enter personal identification data (PID) and apply a thumb to a scanning area which may take the temperature of the thumb as well as the fingerprint from the thumb and match it with prestored data representing an acceptable thumbprint corresponding to a particular PID. An authenticator receives the biometric input (namely the thumbprint) and matches it with the prestored thumbprint indexed by the personal identification data also entered by the user.

FIG. 1 shows one example of a conventional biometric access device in a form of a thumb scanner wherein a thermal biometric detector 100 and a keyboard or other input device 102 allows personal identification data, such as a PIN, to serve as two factor authentication data The authenticator 104 stores a symmetric key, such as an encryption key, in a table 106 by a PIN 108 input by the keyboard. The device typically returns a stored secret key such as a symmetric key 110 to a personal computer or other device requiring a secret password 112. The two factor authenticator 104 is typically a tamper proof box to thwart device tampering attacks. For example, if an unscrupulous party wished to obtain the secret key, the unscrupulous party needs to open the authenticator device and tap into the secret key table to obtain the secret encryption key for example. Some tamper proof authenticators have self destructing devices that destroy the secret key upon potential tampering of the device. Hence tamper proof devices are typically expensive devices.

The thermal biometric access device typically monitors thumb temperature to prevent copied input attacks. Two factor authentication devices can suffer from copied input attacks such as where a thumb scanner device may accurately authenticate a thumbprint lifted from a pencil or other surface as opposed to the actual thumb of the person (originator).

Another problem arises in that with biometric input devices, variability of biometric input can result in inaccurate authentications. For example, if a user does not properly press his/her thumb in the exact required location on a thumbprint scanner, proper authentication may not result.

Conventional two factor biometric authentication devices and methods typically take the biometric input and make a pass/fail authentication decision based upon whether or not the input is a sufficiently-close match to some pre-stored representation of that user's biometric data. Such devices typically do not correct for errors in the biometric input. Although some devices require the user to apply several applications of a thumbprint, for example to obtain an average value for a biometric input, such systems do not typically correct for errors in the biometric input.

Consequently there exists a need for a multi-factor biometric authenticator and method which does not require tamper proofing of the device. In addition, it would be advantageous if such a system would effectively deal with the variability of biometric input data without compromising security. In addition, it would be desirable if such a system would not store a secret key for ready extraction by an unscrupulous hacker. In addition, it would be advantageous if such a system would not require the storage of matching biometric data.

DETAILED DESCRIPTION OF THE INVENTION

A multi-factor biometric authenticating device, such as a two factor device, and method generates error correction based partial encryption key seed data based on a plurality of sample biometric inputs, such as raw biometric data. The error correction based partial encryption key seed data serves as a partial seed for generating a secret encryption key for encrypting user data The first partial seed is combined with a second partial encryption seed to generate the secret encryption key. The device stores the error correction based partial encryption key seed data and does not store the secret encryption key. Biometric input data serves as the second partial encryption key seed key which is combined with the partial encryption key seed data and used to generate the secret encryption key. The disclosed system and method does not require storage of biometric data or a secret encryption key, such as symmetric keys, and hence the system does not need to be tamper proof.

Figure 1:
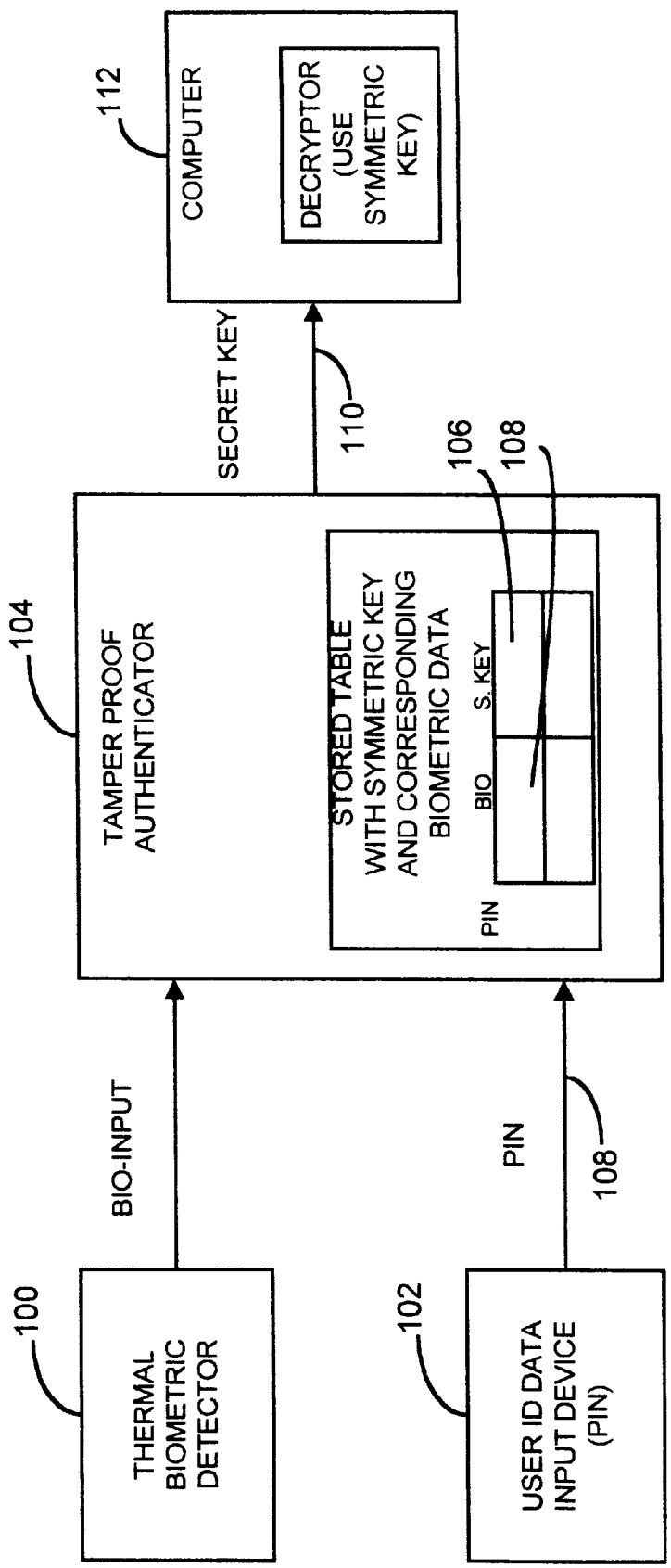
FIG. 1 is a block diagram of one type of prior art tamper proof authenticator in the form of a two factor biometric authentication device.
Figure 2:
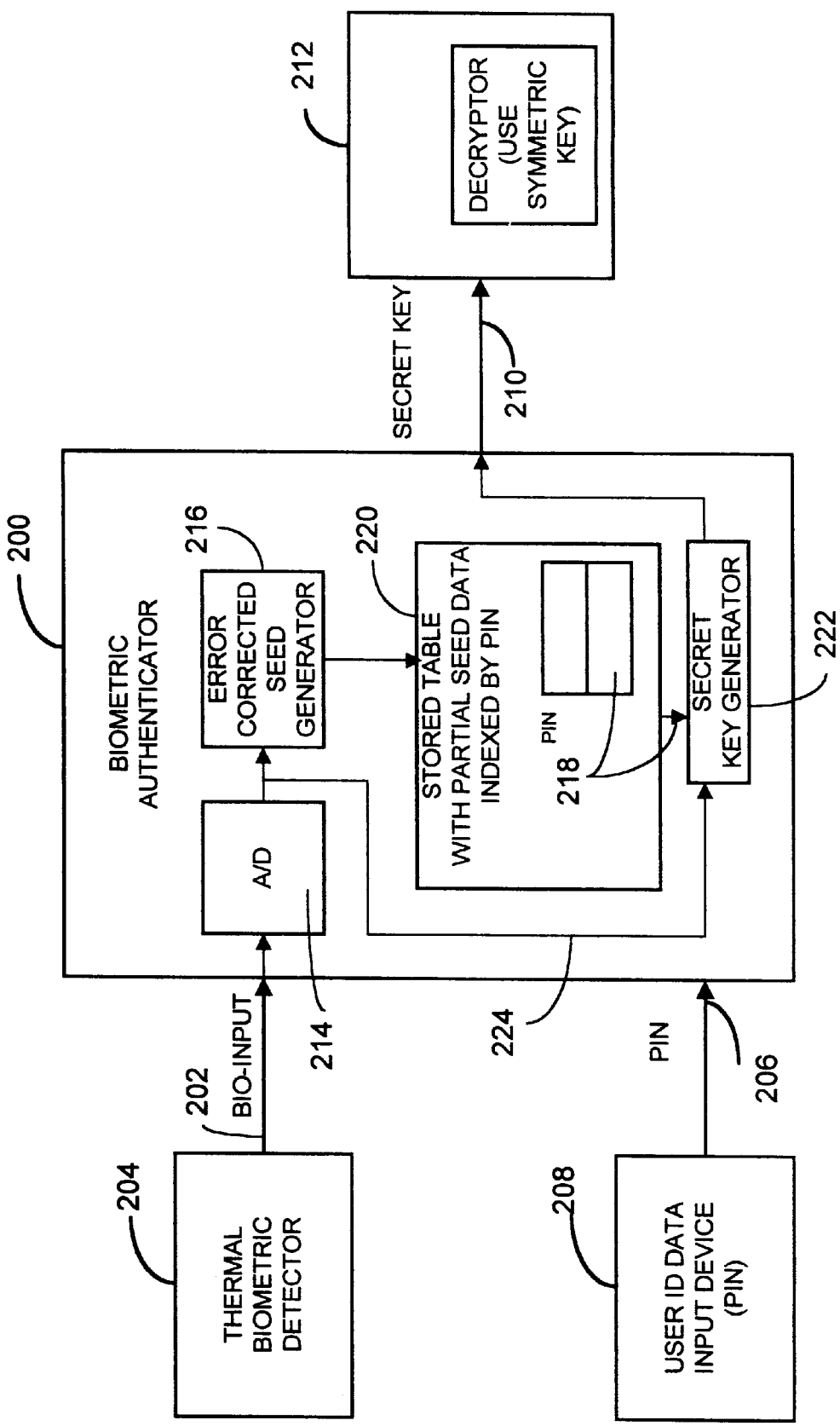
FIG. 2 is a block diagram depicting one embodiment of a multi-factor biometric authenticating device utilizing error correction based partial encryption key seed data in accordance with one embodiment of the invention.

FIG. 2 shows a two factor biometric authenticating device 200 which receives first factor biometric data 202 from a biometric detector 204, such as a thermal thumb scan detector. The biometric authenticating device 200 may be a suitably programmed personal computer, other type of processing device, digital circuitry or any suitable combination thereof. The two factor biometric authenticating device 200 also receives second factor data 206 such as a password or personal identification number referred to herein as I.D. data, as entered from a key pad, voice input device or other suitable user I.D. data entry device 208. The two factor biometric authenticating device 200 outputs a secret key, such as a secret encryption key 210 to a personal computer 212 or other suitable device that needs the secret key to decrypt encrypted data, for example.

The two factor biometric authenticating device 200 includes, if necessary, an analog to digital converter 214 that converts the biometric input data 202 to a digital signal The two factor biometric authenticating device 200 includes an error correction based partial encryption key seed data generator 216 that generates first partial seed data 218, such as error corrected partial encrypted key seed data. The two factor biometric authenticating device 200 also includes memory 220 for storing the error correction based partial encryption key seed data 218 to facilitate authentication of a user based on later received biometric input data. The memory 220 stores a copy of the user ID data 206 indexed to the error correction based partial encryption key seed data 218.

The two factor biometric authenticating device 200 also includes a secret key generator 222 that generates the secret encryption key 210 based on the error correction based partial encryption key seed data 218 and sampled biometric input data 224. The sampled biometric input data 224 serves as second partial encryption key seed data that when combined with the first partial key seed data 218 allows generation of the secret encryption key 210.

Figure 3:
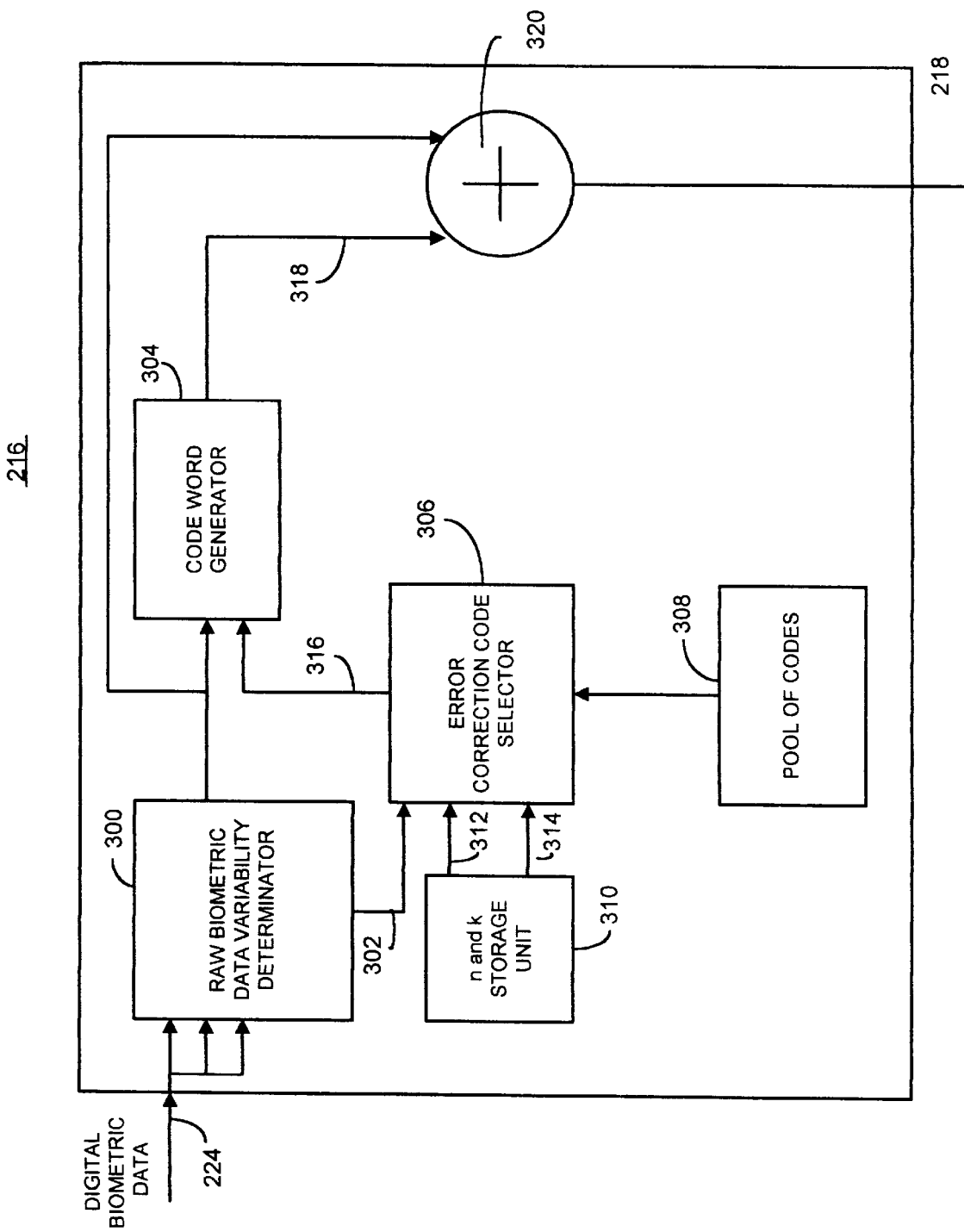
FIG. 3 is a block diagram depicting one example of an error correction based partial encryption key seed generator in accordance with one embodiment of the invention.
Figure 4:
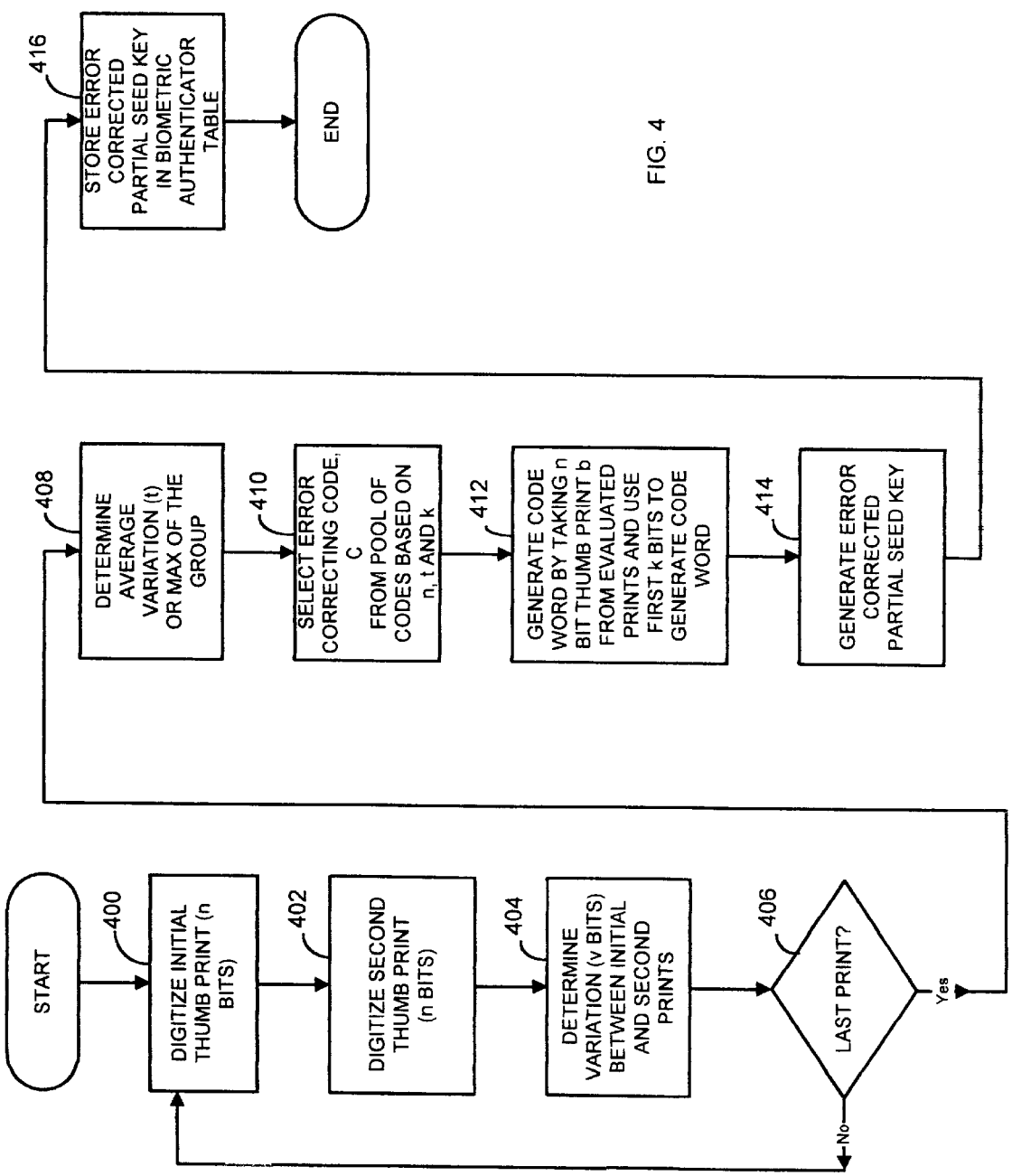
FIG. 4 is flowchart illustrating one embodiment of an initialization procedure used by the system shown in FIG. 2.

Referring to FIGS. 3 and 4, the operation of the error correction based partial encryption key seed data generator 216 will be explained. As shown in FIG. 3, the error correction based partial encryption key seed data generator 216 includes a raw data variability determinator 300 for determining variability data (t) 302 representing variability among a plurality of sampled biometric inputs (b, b') from the input data 202 during initialization. For example, the variability of (b) represented as variability data (t), may be generated by determining a value (t) such that for two scans of a same biometric input (b,b') a Hamming distance between scans represented as $d_H(b,b')$, is less than or equal to (t) an acceptably high percentage of the time. The Hamming distance, as known in the art, represents the number of bits that are different between two binary vectors, The raw data variability determinator 300 also selects at least one of the biometric inputs, e.g., at least one thumbprint out of a number of thumbprints entered during initialization of the system, to generate the first partial seed 218. The error correction based partial encryption key seed data generator 216 also includes a code word data generator 304, an error correction code selector 306, memory 308 for storing a pool of codes, and a bit length storage register 310 that stores the length of a bit stream (b) such as the length of a bit stream that will represent a complete biometric input, such as an entire thumbprint.

The storage register 310 stores the bit length (n) 312 of biometric input data stream (b) and a bit subset of length (k), 314 representing a subset of the n-bit data, where (n−k) which are the bits not included in the subset (k) may be between 50–100 bits, for example. The error correction code selector 306 selects an error correction code from the group of codes stored in the memory 308 based on the variability data (t) 302, the n-bit data 312, and the k-bit data 314 such that an (n,k,d) linear error correcting code C is selected such that (d/2)>(t), where d represents the minimum Hamming distance between codewords, a generator matrix G for the correcting code C is suitably dense, and (n−k) is between 50 and 100 bits. The selected error correction code 316 is used by the code word data generator 304 to generate code word data 318.

The error correction based partial encryption key seed data generator 216 also includes an exclusive OR circuit 320 that performs an exclusive OR operation (i.e., addition modulo 2) with a selected one of the biometric inputs received as data 202 and the code word data 318 to generate the error based partial encryption key seed data 218. Hence the error correction based partial encryption key seed data generator 216 generates the error correction based partial encryption key seed data 218 based on code word data 318 derived at least in part from variability data (t) 302 obtained from among the plurality of sampled biometric input from the biometric input data 202.

As shown in FIG. 4, the error correction based partial encryption key seed data generator 216 generates the error correction based partial encryption key seed data 218 during an initialization process. The process starts in block 400; for illustrative purposes, the biometric input will be assumed as a thumbprint and the two factor authenticator digitizes the initial thumbprint as a bit length of n-bits. The value of n can be fixed, that is, stored, prior to Initialization; in addition, the value of k may also be fixed a priori. The user then applies another thumbprint and the system digitizes the second thumbprint as a bit stream of n-bits as shown in block 402. The authenticator 200 then determines the variation (such as v-bits) between initial and second digitized fingerprints as shown in block 404. The two factor authenticator 200 then determines whether it has analyzed the last print it is seeking during the initialization phase to determine average or maximum variation as shown in block 406. If it is not the last thumbprint or biometric input to be analyzed, the process continues back to block 400 as shown. Hence the system compares pairs of thumbprints and repeats the comparison among pairs (x) times.

If the two factor authenticator has determined that the last biometric input has been digitized and analyzed, the system determines the variation (t)−(variability data 302) as shown in block 408. The error correction code selector 306 then selects the error correction code (c) from the pool of codes in memory 308 based on the n-bit data, k-bit data and variability data (t) as shown in block 410. For example, an (n,k,d) linear error correcting code C may be selected such that (d/2)>t and such that the generator matrix G for C is dense.

As shown in block 412, the code word generator 304 generates a code word by taking an n-bit thumbprint represented as (b) from the thumbprints that have been evaluated, or from a new thumbprint that is entered by a user, and uses the first k-bits to generate the code word. The error correction based partial key seed generator 216 then generates an error correction based partial encryption key seed data 218 and stores it in memory table 220 corresponding to the user ID data 206 entered during initialization. This is shown in blocks 414 and 416.

The pool of error correction codes may include linear error correction codes such as BCH codes or Goppa codes. The error correction code selector 306 may determine an error correcting code, for example, based on memory requirements, complexity, or performance considerations.

The partial encryption key seed data may be generated according to the following method: produce an n-bit value b for a user's biometric input; using the first (leftmost) k bits of b, compute a codeword c of the code C. Next, set the last (rightmost) n−k bits of (b exclusive ORed with c) to be p (thus p is the difference between the redundancy bits of the valid codeword c and the rightmost random (with respect to the code C) bits of the user's biometric input). The partial encryption key seed data, in this example, is the value p.

Figure 5:
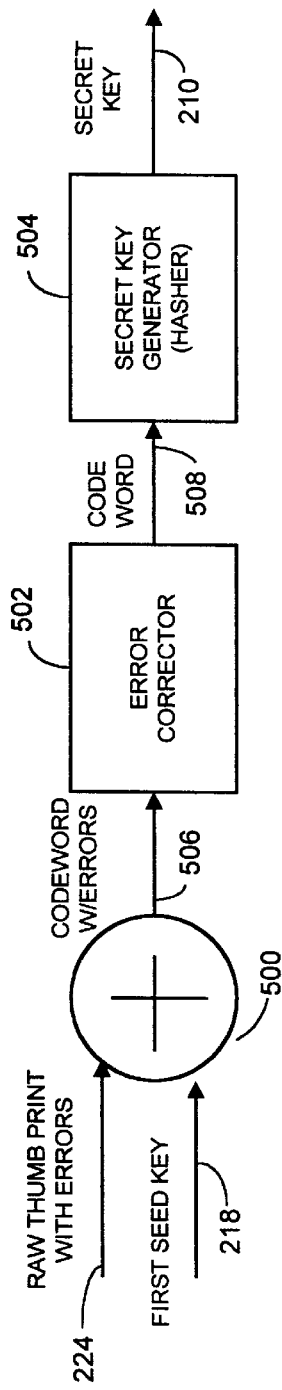
FIG. 5 is a block diagram depicting one embodiment of an error correction based secret key generator in accordance with one embodiment of the invention.

FIG. 5 shows the error correction based secret key generator 222 having an exclusive OR circuit 500, an error correction circuit 502 and a secret encryption key generator circuit 504. The error correction based secret key generator 222 receives raw biometric input data with errors such as data 224 which may be for example the entry of a thumbprint after initialization. The input data is the error correction based partial encryption key seed data 218 obtained from the memory 220 corresponding to associated user ID data 206. The exclusive OR circuit 500 combines the error correction based partial encryption key seed data 218 and the raw thumbprint data, which serves as second partial encryption key seed data, to produce code word data 506 which serves as input data to the error correction circuit 502. The error correction circuit 502 provides error correction, such as is commonly used in linear error correcting codes (e.g., BCH codes or Goppa codes) to the second code word data 506 to produce an error corrected code word 508. The secret encryption key generator 504 produces the secret encryption key 210 by modifying the error corrected code word. For example the secret key generator may apply a hash function to the error corrected code word to produce the secret encryption key 210.

The error correction based partial encryption key seed generator and the secret key generator can be any suitable hardware and software combination implemented using a suitable programmed microprocessor with associated memory, or any other suitable mechanism.

Figure 6:
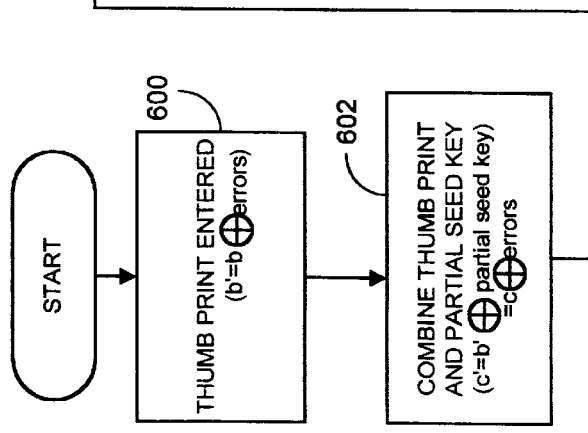
FIG. 6 is a flowchart depicting operation of the error correction based secret key generator as shown in FIG. 5.

FIG. 6 shows an example of the operation of the error correction based secret key generator 22 shown in FIG. 5. The error correction based secret key generator 222 obtains the raw biometric input with errors 224 represented as $$b' = b \oplus errorvector$$

as shown in block 600. The error correction based secret key generator 222 then combines the raw biometric data and the first partial seed 218 represented as $$c' = b' \oplus partialseedkey = c \oplus errorvector$$

as shown in block 602. The error correction based secret key generator 222 then uses the error correction circuit 502 to remove errors to generate and code the error corrected code word 508 as shown in block 604. As shown in block 606, the secret key generator generates the secret encryption key data 210 by hashing the code word 508.

Preferably, although not required, the system of FIG. 4 applies an exclusive OR operation on the rightmost bits of the first code word data in the selected biometric input to produce the first partial seed wherein the rightmost bits include n–k bits of the n-bit input data.

If desired, the retrieved codeword c may be used to compute other values. For example, instead of computing a symmetric key which may be used to decrypt a user account file or other data, the retrieved codeword may be used in the computation of an asymmetric key pair for the user. Thus, the unique codeword for that user would be used to derive a unique private key that can be used in subsequent authentication protocols with other entities. Moreover, the parameters k,d, and G may be known system wide or may be indexed in individual devices by user name. These parameters need not be kept secret.

As is evident from the above description, the disclosed system stores what appears to be a random value for each of a number of user ID data wherein the random value for each user serves as a partial key or key seed data to generate a secret key. Hence one half of the seed is stored in the authenticator, and the second half of the seed, biometric input data, is dynamically input on an ongoing basis. The two halves then serve to generate the secret encryption key which is generated by the two factor authenticator, but not stored in the two factor authenticator.

Variability in the user's input biometric data is accounted for with no compromise in system security through the use of the error correcting code, and the random-looking data stored in the authenticator (of no value on its own for the purpose of authentication) precludes the need for costly tamper-proofed devices.

It should be understood that the implementation of other variations and modifications of the invention in its various aspects will be apparent to those of ordinary skill in the art, and that the invention is not limited by the specific embodiments described. It is therefore contemplated to cover by the present invention, any and all modifications, variations, or equivalents that fall within the spirit and scope of the basic underlying principles disclosed and claimed herein.

What is claimed is:

1. A two factor biometric authenticating device comprising:

means for generating error correction based partial encryption key seed data based on a plurality of sampled biometric inputs wherein the error correction based partial encryption key seed data serves as a first partial seed for generating a secret encryption key for encrypting unique user data, when combined with a second partial encryption key seed that is based on later received biometric input data, and means for storing internal to the biometric authenticating device the error correction based partial encryption key seed data to facilitate authentication of a user based on later received biometric input data.

2. The device of claim 1 wherein the means for generating generates error correction based partial encryption key seed data, based on first codeword data derived at least in part from variability data obtained from among the plurality of sampled biometric inputs.

3. The device of claim 2 wherein the means for generating includes:

means, operatively responsive to the plurality of sampled biometric inputs, for determining variability data representing variability among the plurality of sampled biometric inputs and for selecting at least one of the plurality of biometric inputs;

means for storing n-bit data of biometric input data and k-bits of data representing a subset of the n-bit data;

means, operatively responsive to the variability data, the n-bit data and the k-bit data, for selecting an error correction code from a group of codes;

means, operatively responsive to the selected biometric input and the selected code, for generating the first codeword data; and means for operatively combining the first codeword data with the selected biometric input to generate the error correction based partial encryption seed data.

4. The device of claim 3 wherein the means for operatively combining performs an exclusive OR operation between the first codeword data and the selected biometric input.

5. The device of claim 1 further including means, operatively coupled to the means for storing, for generating a secret encryption key based on the error correction based partial encryption key seed data and at least one of the sampled biometric inputs.

6. The device of claim 5 wherein the means for generating the secret encryption key includes:

means for operatively combining the error correction based partial encryption key and the second partial encryption key seed to produce second codeword data wherein the second partial encryption key seed includes biometric input data;

means for providing error correction to the second codeword data to produce an error corrected codeword; and means, responsive to the error corrected codeword, for producing a secret encryption key by modifying the error corrected codeword.

7. The device of claim 6 wherein modifying the error corrected codeword includes applying a hash function to the error corrected codeword to produce the secret encryption key.

8. The device of claim 4 wherein the means for operatively combining applies an exclusive OR operation on n–k bits of the first codeword data and the selected biometric input to produce the first partial seed.

9. A method for providing two factor biometric authentication comprising:

generating error correction based partial encryption key seed data based on a plurality of sampled biometric inputs wherein the error correction based partial encryption key seed data serves as a first partial seed for generating a secret encryption key for uniquely encrypting user data, when combined with a second partial encryption key seed that is based on later received biometric input data, and storing internal to a biometric authentication device the error correction based partial encryption key seed data to facilitate authentication of a user based on later received biometric input data.

10. The method of claim 9 wherein generating error correction based partial encryption key seed data includes generating error correction based partial encryption key seed data, based on first codeword data derived at least in part from variability data obtained from among the plurality of sampled biometric inputs.

11. The method of claim 10 wherein generating includes:

determining variability data representing variability among the plurality of sampled biometric inputs and selecting at least one of the plurality of biometric inputs;

storing n-bit data of biometric input data and k-bits of data representing a subset of the n-bit data;

selecting an error correction code from a group of codes based on the variability data, the n-bit data and the k-bit data;

generating the first codeword data based on at least the selected biometric input and the selected code; and operatively combining the first codeword data with the selected biometric input to generate the error correction based partial encryption seed data.

12. The method of claim 11 wherein the step of operatively combining includes performing an exclusive OR operation between the first codeword data and the selected biometric input.

13. The method of claim 9 further including the step of generating a secret encryption key based on the error correction based partial encryption key seed data and at least one of the sampled biometric inputs.

14. The method of claim 13 wherein the step of generating the secret encryption key includes:

operatively combining the error correction based partial encryption key and the second partial encryption key seed to produce second codeword data wherein the second partial encryption key seed includes biometric input data;

providing error correction to the second codeword data to produce an error corrected codeword; and producing a secret encryption key by modifying the error corrected codeword.

15. The method of claim 14 wherein modifying the error corrected codeword includes applying a hash function to the error corrected codeword to produce the secret encryption key.

16. The method of claim 12 wherein operatively combining includes applying an exclusive OR operation on n–k bits of the first codeword data and the selected biometric input to produce the first partial seed.

17. A two factor biometric authenticating device comprising:

means for generating error correction based partial encryption key seed data based on first codeword data derived at least in part from variability data obtained from among a plurality of sampled biometric inputs, wherein the error correction based partial encryption key seed data serves as a first partial seed for generating a secret encryption key for encrypting unique user data, when combined with a second partial encryption key seed that is based on later received biometric input data, and means for storing internal to the biometric authenticating device the error correction based partial encryption key seed data to facilitate authentication of a user based on later received biometric input data; and means, operatively coupled to the means for storing, for generating a secret encryption key based on the error correction based partial encryption key seed data and at least one of the sampled biometric inputs.

18. The device of claim 17 wherein the means for generating includes:

means, operatively responsive to the plurality of sampled biometric inputs, for determining variability data representing variability among the plurality of sampled biometric inputs and for selecting at least one of the plurality of biometric inputs;

means for storing n-bit data of biometric input data and k-bits of data representing a subset of the n-bit data;

means, operatively responsive to the variability data, the n-bit data and the k-bit data, for selecting an error correction code from a group of codes;

means, operatively responsive to the selected biometric input and the selected code, for generating the first codeword data; and means for operatively combining the first codeword data with the selected biometric input to generate the error correction based partial encryption seed data.

19. The device of claim 17 wherein the means for generating the secret encryption key includes:

means for operatively combining the error correction base partial encryption key and the second partial encryption key seed to produce second codeword data wherein the second partial encryption key seed includes biometric input data;

means for providing error correction to the second codeword data to produce an error corrected codeword; and means, responsive to the error corrected codeword, for producing a secret encryption key by modifying the error corrected codeword.

* * * * *